(12) United States Patent
Zeller et al.

(10) Patent No.: US 8,588,480 B2
(45) Date of Patent: Nov. 19, 2013

(54) METHOD FOR GENERATING A DENSITY IMAGE OF AN OBSERVATION ZONE

(75) Inventors: Alexandre Zeller, Neuilly sur Seine (FR); Alexandre Revue, Paris (FR)

(73) Assignees: CLIRIS, Neuilly sur Seine (FR); Alexandre Zeller, Neuilly sur Seine (FR)

( * ) Notice: Subject to any disclaimer, the term of this patent is extended or adjusted under 35 U.S.C. 154(b) by 686 days.

(21) Appl. No.: 12/867,285

(22) PCT Filed: Feb. 12, 2009

(86) PCT No.: PCT/FR2009/050225
§ 371 (c)(1),
(2), (4) Date: Nov. 3, 2010

(87) PCT Pub. No.: WO2009/101365
PCT Pub. Date: Aug. 20, 2009

(65) Prior Publication Data
US 2011/0103646 A1    May 5, 2011

(30) Foreign Application Priority Data
Feb. 12, 2008 (FR) ..................... 08 50874

(51) Int. Cl.
*G06K 9/00* (2006.01)
(52) U.S. Cl.
USPC ........... 382/118; 382/100; 382/103; 382/106; 382/107
(58) Field of Classification Search
USPC .......... 382/115, 118, 124, 100, 103, 106, 107
See application file for complete search history.

(56) References Cited

U.S. PATENT DOCUMENTS

| | | | |
|---|---|---|---|
| 6,771,818 B1* | 8/2004 | Krumm et al. | 382/225 |
| 6,967,674 B1 | 11/2005 | Lausch | |
| 7,930,204 B1* | 4/2011 | Sharma et al. | 705/7.32 |
| 2003/0039379 A1 | 2/2003 | Gutta et al. | |
| 2008/0166045 A1* | 7/2008 | Xu et al. | 382/170 |
| 2009/0237499 A1* | 9/2009 | Kressel et al. | 348/77 |
| 2009/0296989 A1* | 12/2009 | Ramesh et al. | 382/103 |
| 2010/0013935 A1* | 1/2010 | Ma et al. | 348/169 |

FOREIGN PATENT DOCUMENTS

| | | |
|---|---|---|
| WO | 2006097680 A | 9/2006 |
| WO | 2008008505 A1 | 1/2008 |

OTHER PUBLICATIONS

Tao Zhao et al: Segmentation and Tracking of Multiple Humans in Crowded Environments, Jul. 1, 2008, pp. 1198-1211, IEEE Transactions on Pattern Analysis and Machine Intelligence, IEEE Service Center, Los Alamitos, CA, US, XP01124157.

(Continued)

*Primary Examiner* — Edward Park
(74) *Attorney, Agent, or Firm* — Young & Thompson

(57) ABSTRACT

A method for generating a density image of an observation zone over a given time interval, in which method a plurality of images of the observation zone is acquired, for each image acquired the following steps are carried out: a) detection of zones of pixels standing out from the fixed background of the image, b) detection of individuals, c) for each individual detected, determination of the elementary surface areas occupied by this individual, and d) incrementation of a level of intensity of the elementary surface areas thus determined in the density image.

15 Claims, 7 Drawing Sheets

(56) References Cited

OTHER PUBLICATIONS

Figure 1:
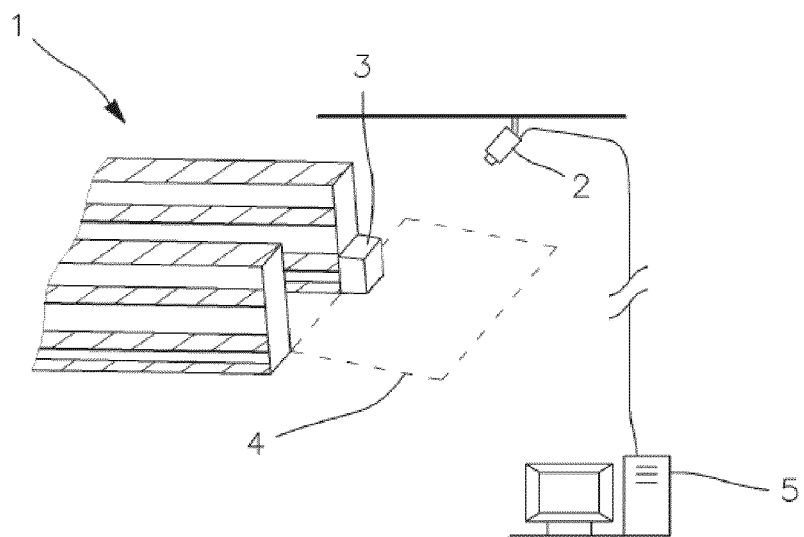

ASPROM: "3e rencontre des start-up des telecoms et du multimedia, issues des grandes ecoles"[Online] S Nov. 8, 2006, pp. 1-6, Retrieved from the Internet:URL:http://aist.enst.fr/docs/0610241240ASPROM.pdf> [retrieved on Oct. 16, 2008], XP002500065.

CLIRIS: "Marketing behavioural analysis solution"[Online] Oct. 5, 2007, pp. 1-4, Retrieved from the Internet: URL:http://web.archive.org/web/20071005083215/www.cliris.net/benefices-frequentation.shtml> [retrieved on 200S-10-16], XP002500066.

Camilo Chang D'Orea: "Hierarchical Partition-Based Representations of Motion-Coherent Regions for Video Object Segmentation"[Online] May 2007, pp. 7-25, Department of Signal Theory and Communications—Technical University of Catalonia Retrieved from the Internet:URL:http://gps-tsc.upc.es/imatge/_Camilo/thesis/thesis.pdf>. [retrieved on Oct. 16, 2008], XP002500067.

Videomining Corporation: "Test Store Platform for retail strategy" [Online] 2006, pp. 1-4, Retrieved from the Internet: URL:http://www.ipcctvcameras.co.uk/pdf/VMOverview.pdf> [retrieved on Oct. 16, 2008], XP002500068.

French Search Report, dated Oct. 22, 2008, in FR 0850874.

International Search Report, dated Nov. 9, 2009, in PCT/FR2009/0S0225.

\* cited by examiner

METHOD FOR GENERATING A DENSITY IMAGE OF AN OBSERVATION ZONE

The present invention relates to a method for generating a density image of an observation zone over a given time interval. It can be used with particular benefit in, but is not limited to, the field of behavioural analysis by computer vision. More precisely, the present invention can be applied to systems in which at least one camera is available, arranged at height close to an object of interest which can be an advertising screen or a merchandising product in a store for example. This camera is arranged so as to film any individual passing close to the object of interest. The video stream from the camera is processed, in particular, in order to carry out behavioural analyses.

In the field of behavioural analysis, there are many algorithms relating to facial detection or monitoring the direction of view, making it possible to estimate the interest shown by the individuals passing close to the objects of interest.

Document U.S. Pat. No. 6,967,674 is known, describing a method for detecting the behaviour of persons passing through a room.

Document US 2003/0039379 is also known, describing a method for counting, in an image, the number of persons showing interest in an object. This interest can be characterized by the time spent by each person on viewing the object or also the expression on the face of these persons.

A purpose of the present invention is a novel method making it possible to express in a novel manner the attraction of an object of interest in an observation zone.

The above-mentioned purpose is achieved with a method for generating a density image of an observation zone through which individuals pass over a given time interval, in which method a plurality of images of the observation zone is acquired by means of a camera, the following steps being carried out for each image acquired:
extracting a fixed background from the image,
a step a) of detecting "blob" zones of pixels standing out from the fixed background of the image, this zone of pixels corresponding in fact to the moving elements, in particular the individuals,
a step b) of detecting the individuals, in which:
  b1) for each blob, several hypotheses for possible positions are generated within a three-dimensional model of the observation zone, using the characteristics of the camera and a standard size of an individual;
  and for each possible position, a head of an individual is detected by applying a three-dimensional model of an individual onto the corresponding blob,
  b2) counting the individuals for each blob; in fact from among the possible position hypotheses, the most probable position is determined vis-à-vis the dimensions of the blob in question,
c) for each detected individual, determining the elementary areas occupied by this individual, and
d) a density image is generated in which consideration is given to a predetermined density image on which the thus-determined elementary areas are incremented by a level of intensity. This increment can be an increase in the level of grey at the places where the individuals were detected. This can also be the colouring of said places. The density image is preferably an image in which the ground plane of the observation zone is displayed.

With the system of the invention, a heat chart is prepared which can be a colour image: red zones corresponding to high occupation rates, and blue zones to low occupation rates, the variation between the colours being made continuously.

In fact, each elementary area of the observation zone has a level of intensity proportional to the occupation rate of this elementary area by individuals. The occupation rate being the total duration during which this elementary area has been occupied by any individual.

The invention can also be defined as follows: a method for generating a density image of an observation zone over a given time interval, in which a plurality of images of the observation zone is acquired, comprising:
  extracting the background from each acquired image,
  detecting zones of pixels, or "blobs", that do not belong to the background,
  contour analysis of said detected zones of pixels, so as to detect individuals present in the observation zone, and seeking possible positions of said heads,
  generating a chart of distances between contours,
  a convolution between said chart of distances and a model of a head (template) so as to generate a convolution chart,
  counting the individuals present in said observation zone,
  calculating the correspondence between an image of the detected zones of pixels and a 2D or 3D model of an individual, in order to establish a presence probability density chart.

According to an advantageous feature of the invention, the step b1) of detecting a head of an individual is carried out by contour analysis.

In particular, the step of detection of heads comprises the following steps:
  applying a Canny filter to the image with respect to the zones of pixels so as to generate an image of contours of the zones of pixels,
  applying a distance transform so as to prepare a chart of distances,
  performing a convolution between the distance chart and a model of a head (template) so as to obtain a convolution chart, and
  applying a watershed algorithm so as to detect heads of individuals.

The use of a watershed algorithm for detecting heads of individuals makes it possible to obtain the most probable positions of heads in the image without relying on arbitrary values (in particular threshold values) which limits the risks of non-detection and guarantees the uniqueness of a local solution.

According to a variant of the invention, the step b1) of detecting the head of an individual is carried out by determining coherences between the head and foot positions. To this end:
a correspondence is established between pixels of the image and points of the corresponding space,
it is assumed that the pixels of a blob correspond to a visible point of an individual and potentially to his feet or head, and these pixels are projected onto the ground planes and planes placed at standard head height, the common projection zone of the feet and of the head being identified as a possible position.

Advantageously, the counting consists of simultaneously identifying the number of individuals present and their respective position. In other words, a segmentation of groups is carried out. Indeed, in most circumstances, the images originate from a camera sometimes having an oblique viewing angle with respect to the ground, thus causing many situations of occlusion between individuals, it is then difficult to use an individual-by-individual search. For this reason, the present invention thus proposes a solution seeking to detect and count a group (simultaneous identification of the number of persons present and their respective position), and not to detect each individual separately.

According to a feature of the invention, the identification of the individuals is carried out from a model of appearance having three ellipses imitating an individual.

This appearance model is optimized according to the following criteria:
- minimizing the number of individuals,
- maximizing the number of pixels different from the background and belonging to the silhouettes,
- minimizing the number of pixels different from the background and not belonging to the ellipses,
- minimizing the number of pixels belonging to the background and to the ellipses, and
- minimizing the distance of the contours of a 2D/3D model.

Then, the optimization is carried out by means of an iterative gradient descent algorithm.

According to an advantageous feature of the invention, the convergence of the iterative algorithm is distributed over successive images. The convergence of the iterative algorithm towards an optimal count of the individuals can take a considerable time. With the present invention, an approximate partial solution for an image at
the time of passing to the following image is considered adequate; this approximate solution serving as a starting point for the following image.

According to an advantageous variant of the invention, step b) of detecting individuals can comprise the following steps:
based on a 3D model of the observation zone, a 3D model of an individual, and characteristics linked to the acquisition device of said plurality of observation images, a perspective projection is carried out in the current image of each elementary area of the observation zone so as to obtain a 2D projection of the models of an individual;

the correspondence of the 2D models on each zone of pixels is calculated so as to obtain a probability of presence density chart; and maxima are sought by using the watershed algorithm so as to determine the detected individuals.

Preferably, the characteristics of the acquisition device comprise the field of view, the positioning and the distortion.

Generally, according to the invention, the extraction of the fixed background of the image is obtained by means of the values of the pixels of the image over time.

According to the invention, in order to take account of the low variations in the values of the pixels, the value of each background pixel can be modelled by a distribution of probabilities. This distribution can be represented by a Gaussian distribution, or more moderately by an average value and two values min and max.

Moreover, in order to minimize as far as possible the influence of objects that do not belong to the background, before averaging the values of the pixels of the image, it is possible to carry out an instantaneous detection of movement by subtracting successive images and applying a threshold in order to obtain a mask corresponding to the pixels which will not be averaged.

Figure 2:
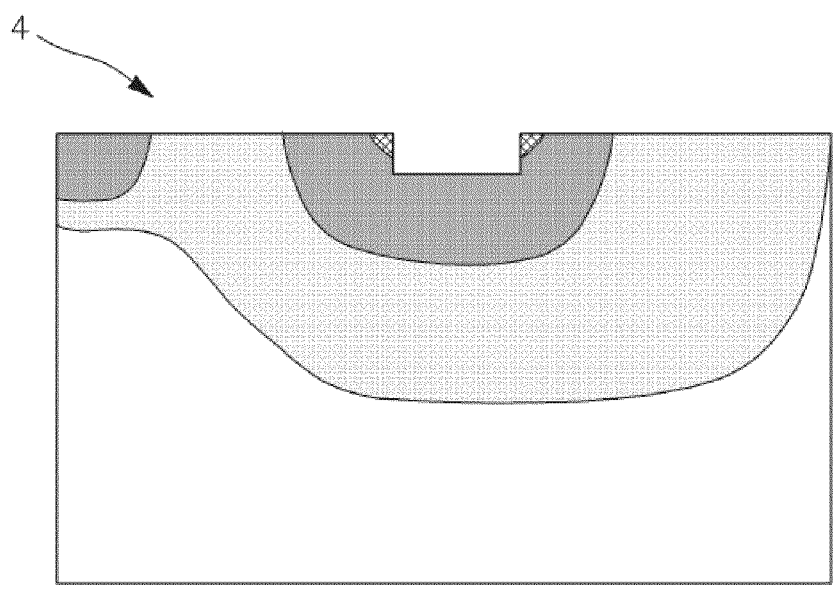
Figure 3:
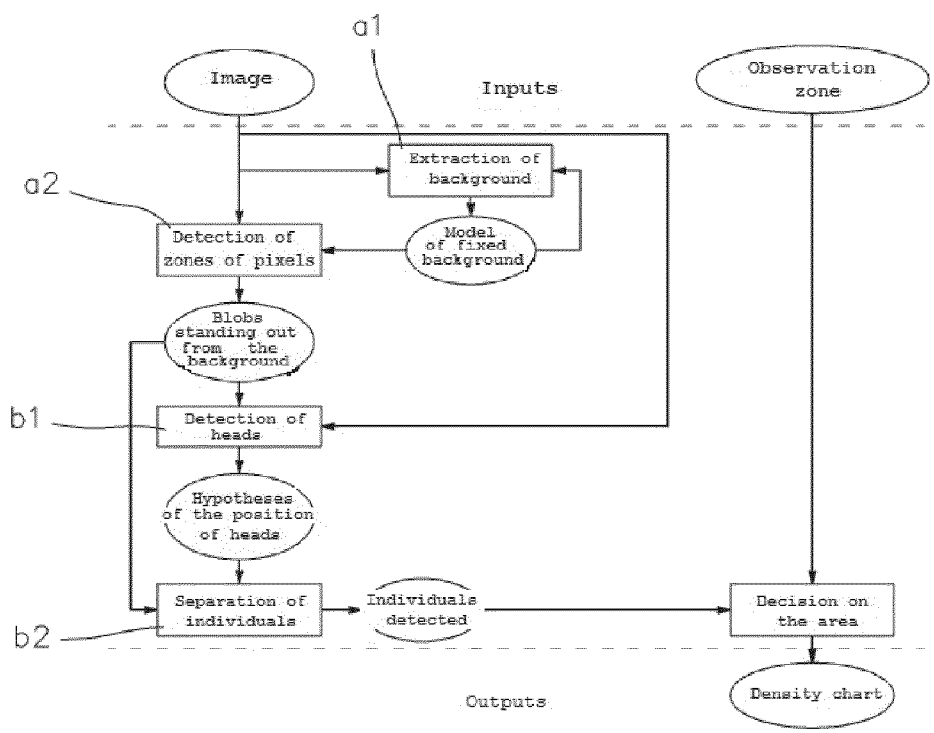
Figures 4, 5:
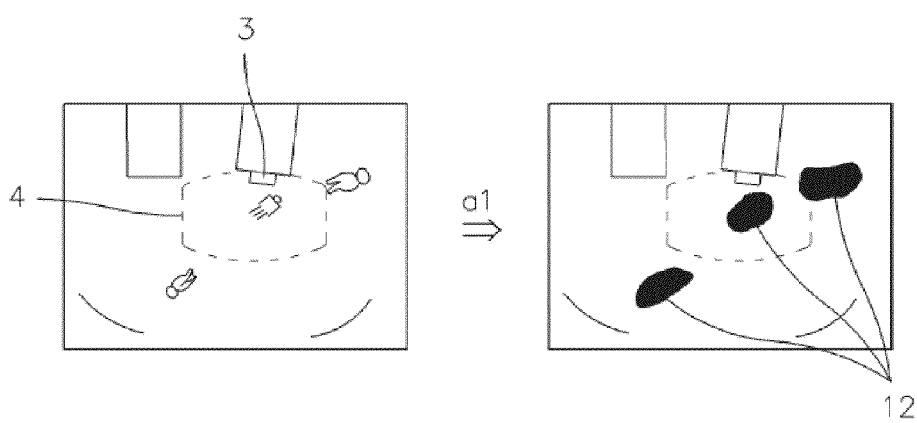
Figure 6:
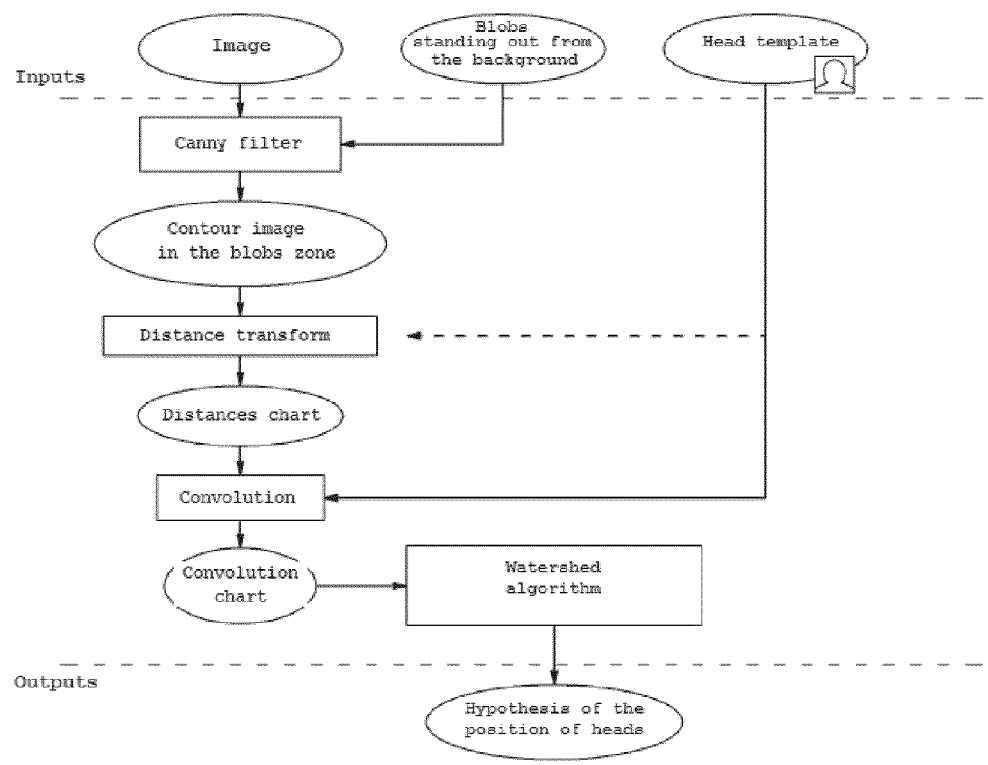
Figure 7:
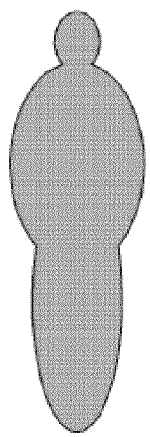
Figure 8:
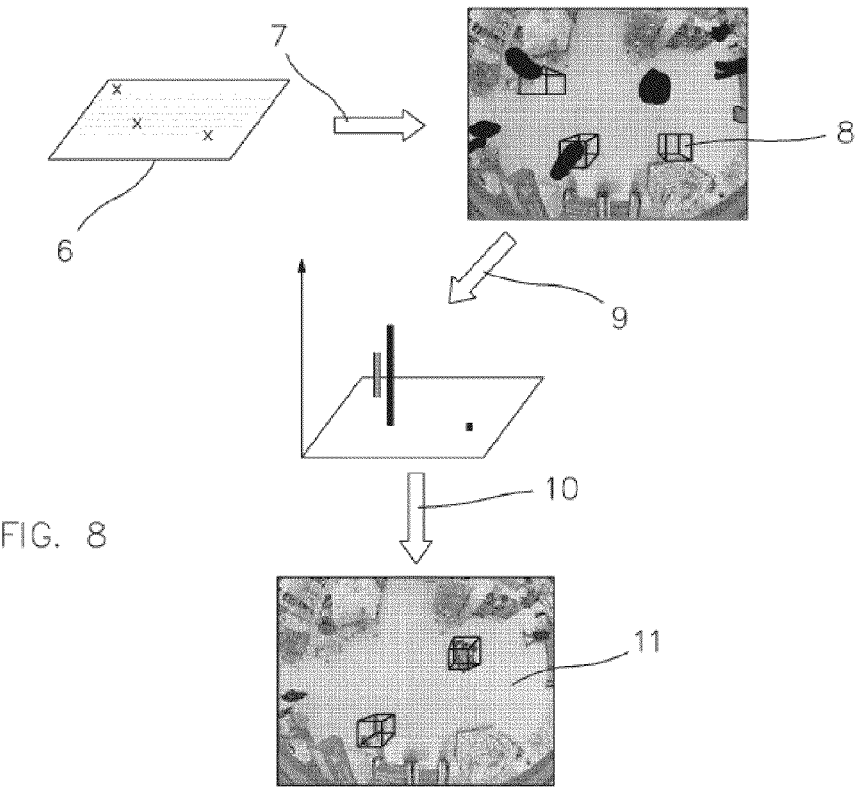
Figure 9:
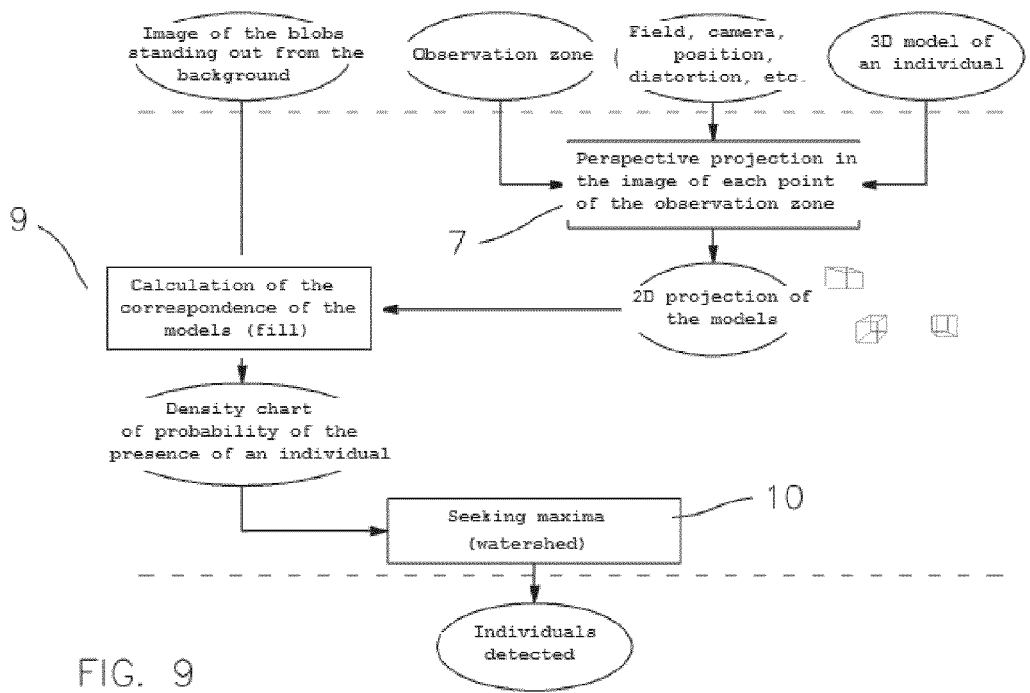
Figure 10:
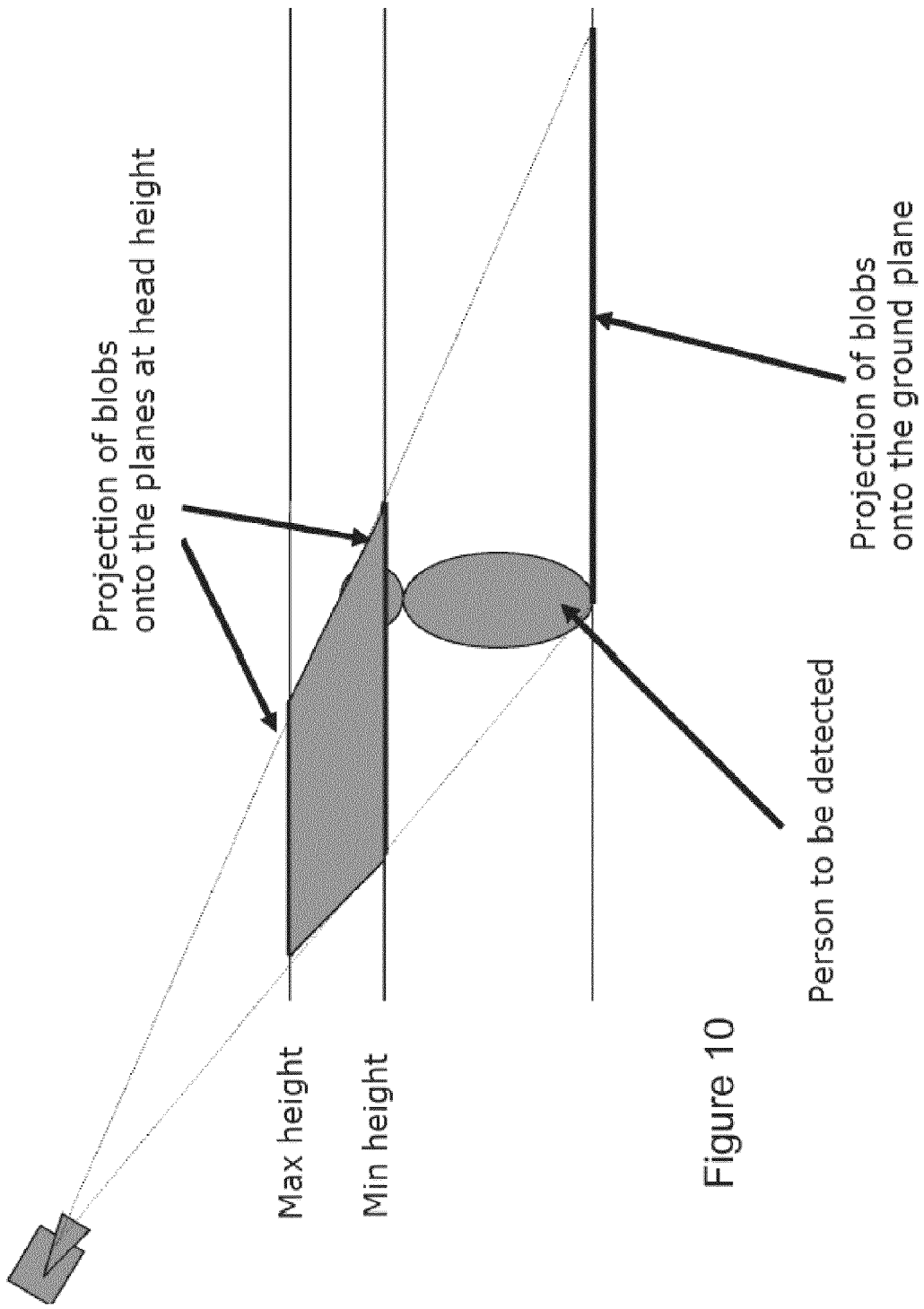
Figure 11:
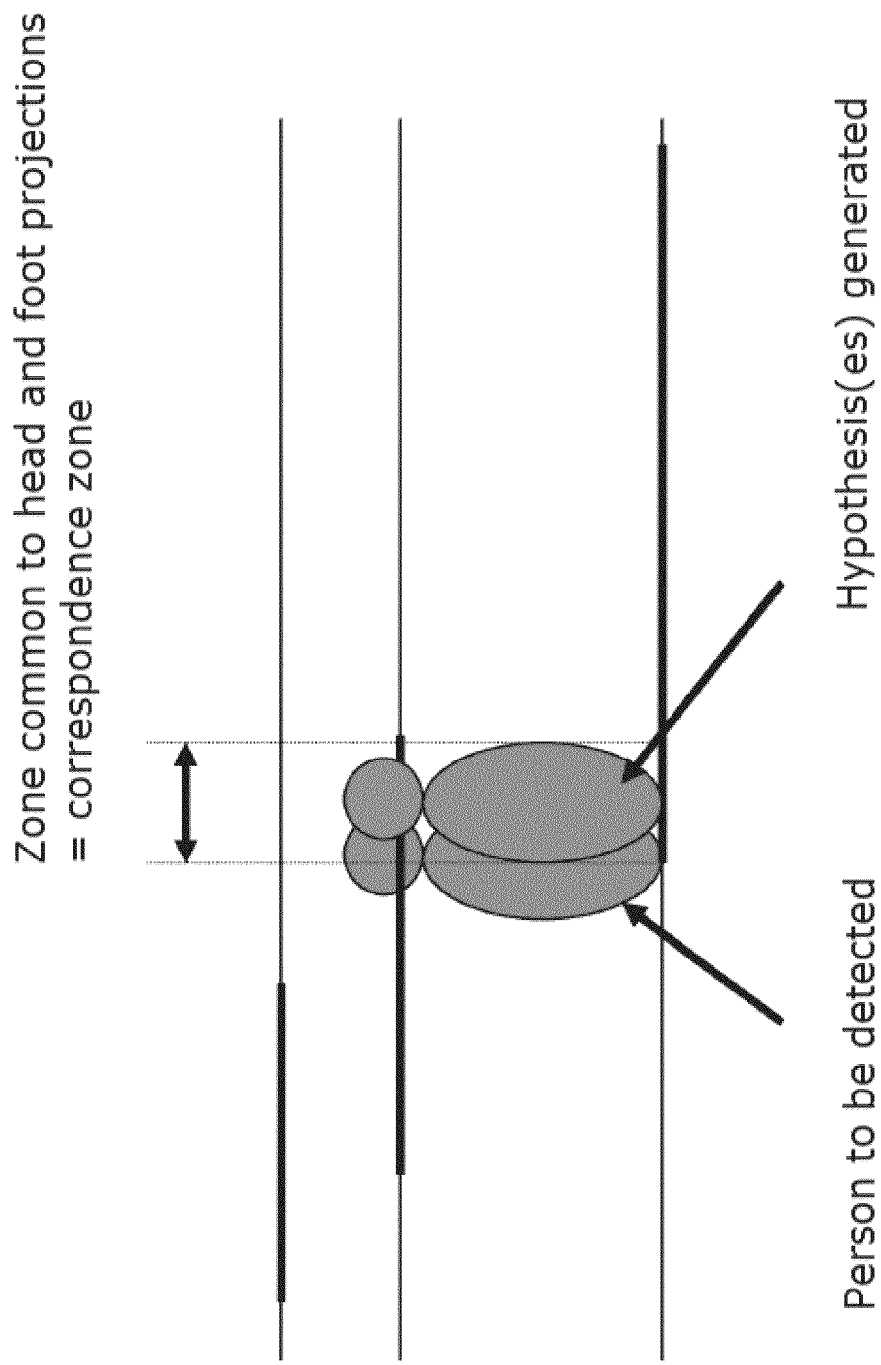
Figure 12:
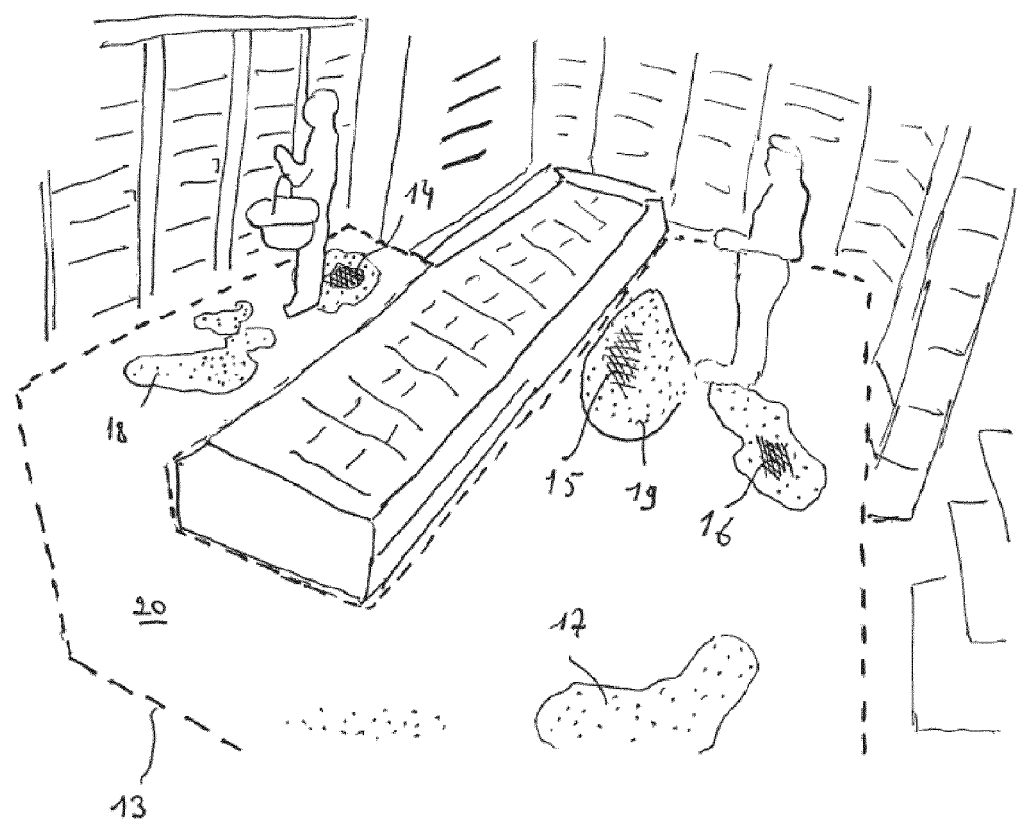

Other advantages and characteristics of the invention will become apparent on examining the detailed description of one embodiment, which is in no way limitative, and the attached drawings, in which:

FIG. 1 is a general diagrammatic view of a store shelf monitored by a camera,

FIG. 2 is a diagrammatic view of a density image of an observation zone according to the invention, FIG. 3 is a general view of a flowchart illustrating different steps of a method according to the invention, FIGS. 4 and 5 are images originating from a monitoring camera without and with apparent blobs, FIG. 6 is a view of a detailed flowchart of an algorithm for the detection of heads of individuals, FIG. 7 illustrates a model of appearance with three ellipses according to the invention, FIG. 8 is a simplified diagram illustrating different steps of a variant of an algorithm for detecting individuals, FIG. 9 is a view of the algorithm described in FIG. 8, FIG. 10 is a simplified diagram illustrating the projection of the blobs, FIG. 11 is a simplified diagram illustrating a zone of correspondence between head and feet projections, and FIG. 12 is a simplified diagram illustrating the density of passage of persons at floor level.

FIG. 1 shows a shelf 1 of a store equipped with a monitoring camera 2 arranged at height. This monitoring camera is fixed to the ceiling and is arranged at an oblique angle so as to film an object of interest 3. An observation zone 4 is defined which is an area around the object of interest 3 and comprised within the field of view of the camera 2. The purpose of the present invention is to develop a density image of this observation zone. This involves assessing the rate of occupation of each elementary area within the observation zone by any individual over a given time interval. The estimation of these rates over the observation zone as a whole is then represented in the form of a density chart, providing a comparative display of the more or less frequented regions of the observation zone. A density image is shown in FIG. 2 where the more-frequented regions are darker than the less-frequented regions. An adjacent dark semi-circular area can be distinguished around the object of interest 3.

The density chart can also be displayed in the form of a thermal image, capable of being shown in perspective in a computer-generated image or as a plan view superimposed on the observed surface plane.

FIG. 1 shows that the monitoring camera 2 is linked to a remote server 5 intended to implement the method according to the invention.

FIG. 3 shows a flowchart of a method according to the invention implemented in the remote server 5. As inputs, the flowchart has an image acquired by the monitoring camera 2 and the observation zone 4. The output corresponds to an incrementation of the intensity value of one or more elementary areas of the density image for the observation zone.

In step a1, the background of the acquired image is extracted so as to obtain a fixed-background model. The background extraction algorithm can be of the iterative type, in particular over several images or a video image stream. The simplest approach for extracting the background consists of averaging the values of the pixels over time. The less the contribution to the average of a moving object is, the more rapidly it moves compared with the cadence of the images.

More precisely, the extraction of the background according to the invention leads to a modelling of grey levels, gradients and average gradient orientations and their standard deviations. By way of example, FIG. 4 shows an image acquired by the monitoring camera 2. Individuals are distinguished inside and outside the observation zone 4 shown with a dashed line. In FIG. 5, step a1 has been carried out so that the moving elements against the fixed background are symbolized by blobs 12.

In step a2, a zone detection is carried out by comparing the image and the background, and by extracting zones of pixels, called "blobs", that do not belong to the background.

In step b1, a detection of the set of the possible positions of persons is carried out. This step can be performed in two ways:
- by carrying out a detection of the head by contour analysis; to this end, the previously-detected blobs and said acquired image are received as inputs;
- by seeking coherences between head and foot positions. To this end, the previously-detected blobs and said acquired image are received as inputs.

The result of step b1 is a set of hypotheses for head positions or for head/foot pairing.

Then, in the step b2, counting of the individuals is carried out. More precisely, an identification of the number of individuals in each blob and an estimation of their position is carried out. In fact the false hypotheses are eliminated in order to identify the actual positions.

Turning now to the head detection method.

FIG. 6 shows in greater detail a head-detection algorithm of step b1. At the input, it is possible to distinguish the acquired image, the blobs standing out from the background, and a model of the head called a "template". The first step consists of applying a Canny filter in order to extract the contours of the heads of individuals in the acquired image in order to obtain a contour image in the blobs zone.

Then, a distance transform is carried out. This is a calculation of a chart of distance between contours. This is a quick and stable calculation of the correlation between the head template and the contours. The output of this step is a chart of distances.

Next, a convolution is carried out between the chart of distances and the template in order to obtain a convolution chart. The convolution comprises a calculation of the correlation between the head template and the contours.

Finally, a watershed algorithm is applied in order to localize and quantify correlation maxima and determine probability maxima for the presence of heads in the acquired image. At the output, a hypothesis on the position of the heads is obtained.

Turning now to the head-foot coherence method.

FIG. 10 shows in greater detail an algorithm for seeking head/foot coherence of step b1. At the input, blobs standing out from the background are considered, the calibration of the camera making it possible to establish a correspondence between the pixels of the image and the points of space corresponding thereto.

It is assumed that the pixels of a blob correspond to a visible point of a person to be detected, and potentially to his feet or head. The projection of these pixels onto the ground planes and planes placed at a standard head height thus delimit the zones where persons would be likely to be found. The conjunction of these projections, shown in FIG. 11, makes it possible to reduce these zones to localized spaces corresponding mainly to the actual positions envisaged for persons in the scene.

FIG. 7 shows an example of model of the appearance of an individual. This model is used in step b2. In particular, the detection of hypotheses of heads or foot-head coherence zones from step b1 generates a large number of false detections. In order to achieve a complete interpretation of the scene, it is sought to identify the individuals on the basis of a three-ellipse appearance model in FIG. 7 (full silhouettes), by optimizing the following criteria:
- minimizing the number of persons,
- maximizing the number of pixels different from the background and belonging to the silhouettes,
- minimizing the number of pixels different from the background and not belonging to the silhouettes,
- minimizing the number of pixels belonging to the background and to the silhouettes, and/or
- minimizing the distance of the contours of a 2D/3D model.

The convergence towards the optimal solution is carried out by iterative methods of the gradient descent type. The evaluation of this solution on the basis of the superimposition of the appearance models allows natural management of the cases of occlusion.

A feature of the detection according to the invention is performance within the three-dimensional reference point of the observed area, the cameras being calibrated with precision in this environment; the calibration consists of estimating with precision the position and orientation of the camera, as well as its intrinsic geometrical properties such a focal length, field, distortions, etc.

Thus the heat chart produced can be directly superimposed onto the plane of the analyzed surface, and only the places corresponding to the actual position of the individuals detected are counted (zone situated at the level of their feet), and not the set of positions on the ground corresponding to the pixels of the blobs.

In FIG. 12, the persons detected (the contours of which are outlined) then generate a measurement only at the place corresponding to the position of their feet. This measurement can thus be displayed in an absolute reference point 13 of the plane. The high-density zones 14, 15 and 16 correspond to the places where the persons stopped for the longest time. In the image of FIG. 12, these zones can be shown in red. Intermediate-density zones 17, 18 and 19 can be shown in white, while the low- or zero-density zones 20 are shown in blue.

FIG. 8 shows another example of a method for detecting individuals. The standard height of a person is hypothesized. The observation zone is considered in its actual 3D coordinates, a "search window" 6, in fact a parallelepiped 8 having the height of a person, is displaced in this zone following a regular grid. For each position of this search window, the projection 7 of the parallelepiped in the acquired image is calculated, and the likelihood of the presence of a person at this position is assessed as a function of the filling of this parallelepiped by the pixels of the blobs. The filling is shown on the graph 9.

This variant therefore makes it possible to manage the perspective of the scene, as well as the camera defects such as distortion, this parameter being taken into account in the calculation of the projection of the parallelepipeds.

This variant also makes it possible to take account of the masking by objects: if it is known that a zone corresponds to an object behind which persons would be likely to be partially masked, the estimation of the probability of presence is corrected as a function of the number of pixels of the masking object situated in the search window.

On the image 11 of FIG. 8, after smoothing, local likelihood maxima are calculated in 11 by an inverse likelihood watershed method; each trough being considered as a possible detection.

In order to avoid multiple detections of a single individual (one of the detections corresponding to his trunk, and interpreted as a person further away), the detections obtained in the previous step are classified and considered in increasing order of the distance separating them from the monitoring camera. The detections are validated from the closest to the furthest away.

For a detection to be validated, it is provided that the parallelepiped is filled by pixels of a blob above a predetermined rate. Each validated detection deletes from the blob the pixels contained in its parallelepiped, in order to avoid multiple detections.

The validated detections inscribe their position on the density image by adding, at their relative position, a Gaussian distribution to a cumulative table.

FIG. 9 shows an example of a flowchart describing this variant. At the input, the 3D observation zone, the characteristics of the monitoring camera (field, position, distortion, etc.) and a model of an individual are taken into account in order to produce the perspective projection 7 of each elementary area of the observation zone. A 2D model of the 3D models of an individual is obtained. The calculation 9 of correspondence of the models (the fill) between an image of the blobs and the 2D model of the models makes it possible to establish a probability density chart of presence for each individual. Thus in 11, the maxima per watershed are sought in order to obtain the detected individuals.

The present invention also relates to a software application or computer program comprising instructions for executing the defined steps in a method according to the invention.

The invention also relates to a means of data storage such as a CD-ROM, a USB stick, a flash memory, etc. storing an application program code which when executed by a digital processor provides functionalities such as those defined in any method according to the present invention.

Of course, the invention is not limited to the examples which have just been described and numerous adjustments can be made to these examples without exceeding the scope of the invention.

The invention claimed is:

1. Method for generating a density image of an observation zone through which individuals pass over a given time interval, thereby acquiring a plurality of images of the observation zone by means of a camera, the following steps being carried out for each acquired image:
   extracting a fixed background from the image,
   a step a) of detecting zones of pixels, "blobs", standing out from the fixed background of the image,
   a step b) of detecting the individuals, in which:
   b1) for each blob, several hypotheses for possible positions are generated within a three-dimensional model of the observation zone by using the features of the camera and a standard size of the individual;
   and for each possible position, a head of an individual is detected by applying a three-dimensional model of an individual onto the corresponding blob,
   b2) counting the individuals for each blob,
   c) for each detected individual, determining elementary areas occupied by this individual, and
   d) a density image is generated in which the thus-determined elementary areas are incremented by a level of intensity.

2. Method according to claim 1, characterized in that step b1) of detecting a head of an individual is carried out by contour analysis.

3. Method according to claim 2, characterized in that the step of detection of heads comprises the following steps:
   application of a Canny filter to the image with respect to the zones of pixels so as to generate an image of contours of the zones of pixels,
   applying a distance transform so as to prepare a chart of distances,
   performing a convolution between the distance chart and a model of a head (template) so as to obtain a convolution chart, and
   applying a watershed algorithm so as to detect heads of individuals.

4. Method according to claim 1, characterized in that the step b1) of detecting the head of an individual is carried out by determination of coherences between head and feet positions.

5. Method according to claim 4, characterized in that for the determination of coherences between head and feet positions:
   a correspondence is established between pixels of the image and points of the corresponding space,
   it is assumed that the pixels of a blob correspond to a visible point of an individual and potentially to his feet or head, and
   these pixels are projected onto the ground planes and planes placed at standard head height, the common projection zone of the feet and of the head being identified as a possible position.

6. Method according to claim 1, characterized in that the counting consists of simultaneously identifying the number of individuals present and their respective position.

7. Method according to claim 6, characterized in that the identification of the individuals is carried out on the basis of an appearance model having three ellipses imitating an individual.

8. Method according to claim 7, characterized in that the appearance model is optimized according to the following criteria:
   minimizing the number of individuals,
   maximizing the number of pixels different from the background and belonging to the silhouettes,
   minimizing the number of pixels different from the background and not belonging to the ellipses,
   minimizing the number of pixels belonging to the background and to the ellipses, and
   minimizing the distance of the contours of a 2D/3D model.

9. Method according to claim 8, characterized in that the optimization is carried out by means of an iterative gradient descent algorithm.

10. Method according to claim 9, characterized in that the convergence of the iterative algorithm is distributed over several successive images.

11. Method according to claim 1, characterized in that the characteristics of the camera comprise the field of view, the positioning and the distortion.

12. Method according to claim 1, characterized in that the extraction of the fixed background of the image is obtained by averaging the values of the pixels of the image over time.

13. Method according to claim 12, characterized in that the value of each background pixel is modelled by a probability distribution.

14. Method according to claim 13, characterized in that before averaging the values of the pixels of the image, an instantaneous detection of movement is carried out by subtracting successive images and a threshold is applied in order to obtain a mask corresponding to the pixels which will not be averaged.

15. Method according to claim 12, characterized in that before averaging the values of the pixels of the image, an instantaneous detection of movement is carried out by subtracting successive images and a threshold is applied in order to obtain a mask corresponding to the pixels which will not be averaged.

* * * * *

UNITED STATES PATENT AND TRADEMARK OFFICE
CERTIFICATE OF CORRECTION

PATENT NO.       : 8,588,480 B2  Page 1 of 1
APPLICATION NO. : 12/867285
DATED            : November 19, 2013
INVENTOR(S)      : Zeller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 770 days.

Signed and Sealed this
Twenty-second Day of September, 2015

Michelle K. Lee
*Director of the United States Patent and Trademark Office*